United States Patent Office 2,972,592
Patented Feb. 21, 1961

2,972,592
AQUEOUS POLYMER BLEND COMPOSITION

George L. Brown, Moorestown, N.J., and Walter W. Toy and Richard E. Zdanowski, Philadelphia, Pa., assignors to Rohm & Haas Company, Philadelphia, Pa., a corporation of Delaware No Drawing. Filed Dec. 10, 1958, Ser. No. 779,287

13 Claims. (Cl. 260—27)

The present invention is concerned with improved aqueous emulsion copolymer compositions which contain polymerized units of a monomer which when homopolymerized produces hard polymers. It is particularly concerned with blends of styrene or vinyltoluene copolymers which have outstanding toughness as well as hardness for a given amount of styrene or vinyltoluene content in the composition.

Styrene copolymers have been recommended for various uses including that as a component in floor polishing compositions (see U.S. Patent 2,606,165), wherein it may be compounded with a wax and other ingredients. In the particular use just mentioned the styrene is copolymerized with an ester of acrylic acid and also with a small amount of acid. A hard product is obtained, but the hardness is obtained at the cost of toughness. In other words, when a large proportion of styrene is incorporated such as about 50% by weight of the copolymer, a brittle product is obtained. In order to overcome the brittleness, a relatively large proportion of plasticizer, such as 15% to 25%, on the weight of copolymer, is needed, but in the formation of unpigmented films this is accompanied with excessive reduction in film hardness and also in excessive dirt pick-up, impractical wear-resistance, and reduced water-resistance.

In accordance with the present invention, it has been discovered that improved toughness can be obtained along with hardness when a blended copolymer composition is employed. Not only is the toughness improved, but the utilization of a blend of copolymers increases the water resistance of compositions which contain polymerized units of monomers, such as acids, which by themselves form water-soluble polymers.

In accordance with the present invention, improved compositions are obtained by blending (A) an aqueous dispersion of a hard copolymer of about 42% to 77% by weight of at least one member selected from the group consisting of styrene and vinyltoluene, about 20% to 46% by weight of an ester of acrylic acid with an alcohol having from 1 to 8 carbon atoms (and preferably from 1 to four carbon atoms), and about 3% to 12% by weight of a copolymerizable unsaturated acid with (B) an aqueous dispersion of a soft copolymer of about 10% to 40%, preferably 10% to 26%, of at least one member selected from the group consisting of styrene and vinyltoluene, 90% to 60%, preferably 90% to 58%, by weight of an ester of acrylic acid with an alcohol having 1 to 8 carbon atoms, and from 0% to 6% by weight of a copolymerizable unsaturated acid. These two components are quite different in that at room temperature the first copolymer is relatively hard and the second copolymer is soft. The hard copolymer may be used in a proportion of 60% to 90% by weight of the total mixture of the hard and soft copolymers. Preferably, the ratio between the hard and soft copolymer when the composition is to be used in a floor polishing material is about 4:1. The vinyltoluene may be any of the ortho, meta, or para isomers including the commercially available mixtures of the several isomers.

The broad ranges of the several components of the two copolymers are as stated above. However, an essential characteristic required when clear compositions are desired is the compatibility of the two copolymers. Thus, the amount of styrene or vinyltoluene in the soft copolymer should be sufficient to render that copolymer compatible with the hard copolymer.

The esters of acrylic acid may be any of those derived from an alcohol having from 1 to 8 carbon atoms, such as cyclohexanol, methanol, ethanol, n-butanol, n-octanol, or t-octanol. Ethyl arcylate or butyl acrylate are ordinarily preferred.

As the copolymerizable acid, methacrylic acid is a preferred example but acrylic acid and itaconic acid are generally entirely as practical in operation. There may also be used maleic acid, fumaric acid, maleamic acid, the dimer of methacrylic acid, aconitic acid, or citraconic acid. However, the latter acids are less readily available and more expensive although they function in satisfactory fashion.

The hard component of the copolymer is preferably styrene when a high gloss is desired in the films or other formed products to be made. Other monomeric materials of high refractive index which can be employed in place of styrene or vinyl toluene include vinylidene chloride, isobornyl methacrylate, benzyl acrylate, and phenoxyethyl methacrylate. If desired, only part of the styrene or vinyltoluene may be replaced with one or more of these monomers, although in most cases it is simpler to replace the styrene or vinyltoluene completely with any one of these other materials which produce hard polymers. In cases where the styrene or vinyltoluene is replaced in the hard component with one of the above-mentioned monomers, then a similar substitution should ordinarily be made in the soft copolymer in order to keep the two systems compatible if clear films are desired.

The copolymers may be formed by an emulsion polymerization technique to form aqueous dispersions of the resulting water-insoluble copolymers, which aqueous dispersions may then be blended for application.

Thus the monomers may be emulsified with an anionic or a non-ionic dispersing agent, about 1 to 6% thereof being used on the weight of total monomers. The acid monomer is, of course, soluble in water so that the dispersing agent serves to emulsify the other two monomers. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in proportions of 0.01 to 2% each, preferably 0.1 to 0.5%, based on the weight of monomers to be copolymerized. The temperature may be from room temperature to 90° C. or more as is conventional. Suitable anionic dispersing agents include the sodium salts of the higher fatty acid sulfates, such as that of lauryl alcohol, the higher fatty acid salts, such as the oleates or stearates of morpholine, triethanolamine, or mixed ethanol-amines, or any of the non-ionic types, such as ethylene oxide modified alkyl phenols, of which tert-octyl phenol modified by 20 to 40 ethylene oxide units is representative, ethylene oxide modified higher fatty alcohols, such as lauryl alcohol, containing 20 to 50 ethylene oxide units, similarly modified long-chain mercaptans, fatty acids, amines, or the like.

The aqueous dispersions of the copolymer blends may be applied as coating compositions or as impregnating compositions for molding to produce products of any desired shape.

The copolymer blend is adapted to form clear coatings having a glossy surface. A translucent appearance may be obtained if one of the component copolymers is so chosen as to be slightly incompatible with the other. Alternatively, a translucent or opaque appearance may be obtained by the incorporation of dulling agents, pigments, or fillers in suitable proportions Examples of suitable pigments which may be included in an amount up to 100% by weight of the copolymer blend include titanium dioxide, carbon black, iron blues, phthalocyanine blues and greens; metal oxides, hydroxides, sulfides, sulfates, silicates, and chromates; organic maroons, aluminum flake, bronze powders, pearl essence, and various fillers or extenders such as talc, barytes, china clay, and diatomaceous earth.

The amount of pigment may be varied widely, depending on the effect desired. The amount of pigment, by weight based on the weight of the organic film-forming material, may vary between about 2% for light, high-hiding pigments, such as carbon black, and about 100% for heavy, low-hiding pigments such as lead chromate.

Generally, the aqueous dispersions which are employed for coating or impregnating purposes may have a pH of about 2 to 11. When mixed with emulsions or aqueous dispersions of waxes or alkali-soluble resins to make floor finishes, it is generally desirable to adjust the pH of the polymer dispersions to at least 7.5 and the pH may be as high as 9.5 to 11 or more. Suitable alkaline or buffering agents such as borax, ammonia, or amines (including the simple water-soluble amines such as diethylamine, triethylamine, morpholine, and triethanolamine) may be introduced to adjust the pH to the desired value.

The aqueous dispersions may contain up to about 10% of a plasticizer whenever it is necessary in a particular application, to provide a lower temperature of film formation from the emulsion polymer dispersions. From 5 to 7% by weight of the plasticizer, based on the weight of copolymer blend, is quite practical.

Since the purpose of the plasticizer is usually to facilitate film formation, and since it is not necessary to impart flexibility into the copolymer blend which is inherently tough and flexible, a fugitive or semi-fugitive plasticizer is preferred rather than a permanent plasticizer. However, permanent plasticizers may be used without the production of films having poor wear-resistance and poor resistance to water since the proportion of plasticizer introduced is relatively small, being not over about 10% by weight of the copolymer blend solids. Certain plasticizers, such as tributoxyethyl phosphate, serve also as leveling agents. The plasticizer may be added following the blending step of the two copolymers but it is preferred that it be added to the hard copolymer before the blending operation.

Exampels of fugitive plasticizers include the monoethyl or monomethyl ether of diethylene glycol, isophorone, benzyl alcohol, and 3-methoxybutanol-1. Examples of essentially permanent plasticizers that are suitable include benzyl butyl phthalate, dibutyl phthalate, dimethyl phthalate, triphenyl phosphate, 2-ethyl hexyl benzyl phthalate, dicyclohexyl phthalate, diallyl phthalate, dibenzyl phthalate, butyl cyclohexyl phthalate, mixed benzoic acid and fatty oil acid esters of pentaerythritol, poly-(propylene adipate)dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene diphthalate, and di-(methylcyclohexyl)phthalate tributoxyethyl phosphate, tributyl phosphate. The particular plasticizer and the amount thereof used are chosen in accordance with the demand for compatibility and efficiency in lowering the film forming temperature.

The compositions may be used for impregnating textiles, leather, paper, or other porous or fibrous materials. They may also be applied to plastic sheets such as cellophone, polyethylene, polyethylene glycol terephthalate, Saran, and the like. They may also be applied to rigid surfaces, including all sorts of metals such as steel, aluminum, copper, brass, bronze, tin, chromium, and wrought iron, and to wood, stone, masonry, brick, glass, asbestos cement shingles or siding and so on.

A particularly advantageous use of the blended copolymers is in the production of floor polishing compositions wherein they are desirably compounded with a wax and an alkali-soluble resin. The wax may either be natural or artificial including such waxes as polyethylene, carnauba wax, montan wax, Japan wax, beeswax, paraffin wax and candelilla wax.

Examples of alakli-soluble resins include shellac, Manila gum, Loba gum, and alkali-soluble alkyds, which are essentially polyesters of aliphatic dicarboxylic acids with aliphatic polyhydric alcohols which may be modified with $C_8$–$C_{18}$ fatty acids, glycerol esters of $C_8$–$C_{18}$ fatty acids, and resin acids, such as abietic or rosin. The resins disclosed in U.S. Patent 2,063,542 may be used. These resins have acid numbers of about 100 to 145. Examples of the dicarboxylic acids include maleic, fumaric, adipic, sebacic, including anhydrides thereof. The polyhydric alcohols may be glycerol, pentaerythritol, trimethylol-ethane, and glycols having 2 to 8 carbon atoms including diethylene glycol, and triethylene glycol. In such compositions the amount of dispersing or emulsifying agent or agents may be from 3 to 8% of the combined weights of blended copolymer and wax. The concentration of the aqueous dispersion for application purposes may desirably be from 8 to 25% solids and is preferably from about 10 to 15% by weight of solids.

In floor polishing compositions the proportions of the main ingredients should be:

| Constituent | Proportion |
| --- | --- |
| A. Copolymer | 20–90 parts by weight. |
| B. Wax | 5–60 parts by weight. |
| C. Alkali-soluble resin | 5–40 parts by weight. |
| D. Wetting, emulsifying and dispersing agents. | 0.5% to 8% of A+B+C. |
| E. Water to make total solids of 8% to 25%. | |

For a non-buffable self-polishing composition, the wax should be not over 35 parts by weight, preferably 5 to 25 parts by weight in the formulation of the above table. For a buffable composition the wax should be at least 35 parts by weight. Examples of wetting and dispersing agents include alkali metal and amine salts of higher fatty acids having 12 to 18 carbon atoms, such as sodium, potassium, ammonium, or morpholine oleate or ricinoleate, as well as the common non-ionic surface active agents. Additional wetting agent improves the spreading action of the polish.

The copolymer, wax, and resin may be mixed in any order desired. For example, the wax or resin or both may be introduced into the aqueous polymer dispersion by adding a dispersion of the wax or resin or both to the copolymer dispersion or vice versa. Preferably, the copolymer is added to a dispersion of the wax and then the resin is mixed in. The wax dispersion may be prepared using any of the anionic or non-ionic dispersing agents mentioned above for use in copolymerization. However, amine salts of soap such as ethanolamine or morpholine oleate or stearate, are quite useful. Besides incorporating wax in floor polishing compositions, an additional plasticizer or a fugitive fluxing aid may be used to reach the desired minimum film-forming temperature of the composition.

It has been found that the compositions obtained with a blend of styrene copolymers as specified above provides a film which not only is hard but is far tougher and less brittle and thus has a lower tendency to powder under abrasion than can be obtained from a single copolymer alone which contains an equivalent amount of styrene. In addition, the blended copolymer while still removable by means of soap solutions or dilute aqueous ammonia because of the acid content, is more resistant to water and has markedly less tendency to form water-spots which normally occur as a result of the drying of water on the surface of the coating than a single copolymer containing an equivalent amount of acid units. In addition, the blended copolymer system is generally characterized by improved levelling characteristics.

The following examples, in which the parts and percentages are by weight unless otherwise indicated, are illustrative of the invention:

*Example 1*

(a) Forty parts of ethyl acrylate, 53 parts of styrene and 7 parts of methacrylic acid were emulsified in 160 parts by weight of water by means of 5 parts by weight of a tert-octylphenol modified with an average of 30 ethylene oxide units. Copolymerization was effected in the presence of ½ part by weight of potassium persulfate and ½ part by weight of potassium metabisulfite to produce a copolymer dispersion. Ammonia was added to raise the pH to 9.5. Then 7 parts of dimethyl phthalate was added to the dispersion.

(b) Sixty-seven parts of ethyl acrylate and 33 parts of styrene were emulsified in 160 parts by weight of water by means of 5 parts by weight of a tert-octylphenol modified with an average of 30 ethylene oxide units. Copolymerization was effected in the presence of ½ part by weight of potassium persulfate and ½ part by weight of potassium metabisulfite to produce a copolymer dispersion.

(c) Forty-five and four-tenths parts of ethyl acrylate, 49 parts of styrene, and 5.6 parts of methacrylic acid were emulsified in 250 parts by weight of water by means of 5 parts by weight of a tert-octylphenol modified with an average of 30 ethylene oxide units. Copolymerization was effected in the presence of ½ part by weight of potassium persulfate and ½ part by weight of potassium metabisulfite to produce a copolymer dispersion. Then 7 parts of dimethyl phthalate were added to the dispersion.

(d) Twenty parts by weight of carnauba wax was melted and then introduced into 120 parts by weight of water at 95° C. which also contained 4 parts by weight of oleic acid and 2.5 parts by weight of morpholine.

(e) Ten parts by weight of ammonia-soluble rosin-maleic type adduct partially esterified with a polyhydric alcohol sold by the Rohm & Haas Company under the trademark Amberol 750 was added to 68.7 parts by weight of water containing 1.4 parts by weight of 28% NH$_4$OH solution and maintained at 50° C. The resulting solution was filtered and diluted to 12% solids.

(f) Ten parts by weight of oleic acid was added to 87 parts by weight of water containing 3.1 parts by weight of morpholine.

(g) Eighty parts of the dispersion obtained in part (a) was mixed with 20 parts of the dispersion obtained in part (b) and the mixture was then diluted with water to a solids concentration of 12%. Seventy-five parts of the resulting blended copolymer dispersion was mixed with 11.4 parts of the wax dispersion of part (d), 11.4 parts of Amberol 750 solution from part (e) and one part of the morpholine oleate solution from part (f).

The resulting coating composition was quite stable on storing. When applied to linoleum, vinyl and asphalt floor tile surfaces, it levelled well and dried rapidly to give tough surfaces characterized by excellent initial gloss and final gloss after submission to foot-traffic conditions. The coating was found to show no water-spotting when exposed to water for one hour after a 4-hour drying at 25° C. Yet it could be removed very easily with a dilute (3%) NH$_4$OH solution.

(h) The copolymer dispersion of part (c) was diluted to 12% solids concentration and then 75 parts by weight of that dispersion was mixed with 11.4 parts of the wax dispersion of part (d), 11.4 parts of Amberol 750 solution from part (e) and 1 part of morpholine oleate solution of part (f). Films of this composition were found to be quite hard but also excessively brittle. When applied to linoleum, vinyl tile, and asphalt tile surfaces its levelling was inferior to the coating composition prepared under (g) above. The initial gloss was somewhat lower and the coating scuffed and displayed powdering tendency under foot-traffic conditions. Under exposure to water after a 4-hour drying at 25° C., similar to the one employed with the floor polish combination prepared in part (g), the film displayed a tendency to water-spot permanently. It could be removed with 3% NH$_4$OH but with some difficulty.

*Example 2*

Example 1 was repeated substituting corresponding weights of methyl acrylate and acrylic acid for the ethyl acrylate and methacrylic acid respectively in part (a) thereof and substituting 90 parts of methyl acrylate and 10 parts of styrene for the ethyl acrylate and styrene in part (b). The results obtained were similar to those obtained in Example 1.

*Example 3*

Similar results were obtained when Example 1 was repeated substituting a mixture of 20 parts n-butyl acrylate, 77 parts of styrene, and 3 parts of itaconic acid for the monomers in part (a) and a mixture of 58 parts of butyl acrylate, 36 parts of styrene, and 6 parts of itaconic acid in part (b).

*Example 4*

Eighty parts of the dispersion obtained in part (a) of Example 1 was mixed with 20 parts of the dispersion obtained in part (b) of Example 1 and the mixture was then diluted with water to a solids concentration of 12%. The blended copolymer dispersion obtained was coated on green-colored asbestos-cement shingles at a rate of 6 pounds (total dry copolymer) per 1000 square feet of the shingles. The coated shingles were then dried in a heated air tunnel in which the temperature was about 140° F. A hard, wear-resistant coating was obtained which prevents the efflorescence which causes whitening of such shingles in irregular splotches. The films had a Knoop hardness number of 11.0. They were resistant to blocking and dirt pick-up and exhibited excellent abrasion resistance.

*Example 5*

There were mixed and ground on a roller mill 266.2 parts of titanium dioxide, 76.0 parts of lithopone, 51.5 parts of mica, 80.7 parts of silica, 6.8 parts of formaldehyde-condensed sodium naphthalene sulfonate, 7.2 parts of diethylene glycol, and 189.5 parts of water. When this mixture had been ground to a smooth, uniform paste, it was mixed thoroughly with 448 parts of the 40% aqueous dispersion of Example 1(a) and 112 parts of the 40% aqueous dispersion of Example 1(b). The resulting product was a white flat aqueous base paint which was applied to masonry or brick surfaces with excellent covering power and good flow and levelling characteristics.

*Example 6*

(a) Twenty parts of ethyl acrylate, 77 parts of styrene, and 3 parts of methacrylic acid were emulsified in 250 parts by weight of water by means of 3 parts by weight of sodium lauryl sulfate. Copolymerization was effected in the presence of ½ part by weight of ammonium persulfate and ½ part by weight of potassium metabisulfite to produce a copolymer dispersion. Morpholine was added to raise the pH to 9.5. Then 7 parts of dibutyl phthalate was added to the dispersion.

(b) Eighty-seven parts of ethyl acrylate, 10 parts of styrene and 3 parts of methacrylic acid were emulsified in 250 parts by weight of water by means of 3 parts by weight of sodium lauryl sulfate. Copolymerization was effected in the presence of ½ part by weight of ammonium persulfate and ½ part by weight of potassium metabisulfite to produce a copolymer dispersion. Morpholine was added to raise the pH to 9.5.

(c) Ten parts by weight of bleached refined shellac was added to 70.9 parts by weight of water containing 2.5 parts by weight of 28% NH$_4$OH. The mixture was heated while under continuous stirring until the solution was complete.

(d) Eighty parts of the dispersion obtained in part (a) was mixed with 20 parts of the dispersion obtained in part (b) and the mixture was then diluted with water to a solids concentration of 12%. 75 parts of the resulting blended copolymer dispersion was mixed with 11.4 parts of the wax dispersion of part (d) of Example 1, 11.4 parts of shellac solution of part (c) hereof and 1 part of the morpholine oleate solution from part (f) of Example 1. The resulting coating composition was quite stable on storing. When applied to linoleum, vinyl and asphalt floor tile surfaces, it levelled well and dried rapidly to give tough surfaces characterized by excellent initial gloss and final gloss after submission to foot-traffic conditions. The coating was found to show no water-spotting when exposed to water for one hour after a 4-hour drying at 25° C. Yet it could be removed very easily with a dilute (3%) NH$_4$OH solution.

*Example 7*

(a) Forty-six parts of ethyl acrylate, 42 parts of styrene, and 12 parts of methacrylic acid were emulsified in 250 parts by weight of water by means of 3 parts by weight of sodium lauryl sulfate. Copolymerization was effected in the presence of ½ part by weight of ammonium persulfate and ½ part by weight of potassium metabisulfite to produce a copolymer dispersion. Morpholine was added to raise the pH to 9.5. Then 7 parts of diethylene glycol monoethyl ether was added to the dispersion.

(b) Ninety parts of ethyl acrylate and 10 parts of styrene were emulsified in 250 parts by weight of water by means of 3 parts by weight of sodium lauryl sulfate. Copolymerization was effected in the presence of ½ part by weight of ammonium persulfate and ½ part by weight of potassium metabisulfite to produce a copolymer dispersion. Morpholine was added to raise the pH of 9.5.

(c) A mixture of 40 parts by weight of emulsifiable low molecular weight polyethylene melting at about 75° C. and 8 parts by weight of oleic acid was melted and 8 parts by weight of morpholine was added to the mixture. The completed melt was added slowly to 184 parts by weight of water heated to 205° F. while under vigorous agitation. The emulsion was allowed to cool and was then diluted to 12% solids.

(d) Eighty parts of the dispersion obtained in part (a) was mixed with 20 parts of the dispersion obtained in part (b) and the mixture was then diluted with water to a solids concentration of 12%. 75 parts of the resulting blended copolymer dispersion was mixed with 11.4 parts of the polyethylene dispersion of part (c), and 11.4 parts of Amberol 750 solution from part (e) of Example 1. The resulting coating showed excellent gloss retention, resistance to scuff-marks, and resistance to wear under actual foot traffic conditions. It was removable with 3% NH$_4$OH solution.

*Example 8*

The coating formulation of Example 7(d) was applied to asphalt floor tiles in the manufacturing plant to protect them from sticking together when packaged. In other words, to those familiar with the art, the coating was used as a "shop coat."

*Example 9*

Eighty parts of the dispersion of Example 7(a) were mixed with 20 parts of the dispersion of Example 7(b) and the mixture was then diluted to 12% solids. The coating composition was applied to white sidewall automobile tires to protect them from abrasion and dust during storage and while in transit. The coating was then removed with ease employing a mild alkali or a soap solution.

*Example 10*

(a) A copolymer dispersion containing an emulsion copolymer of 40% of ethyl acrylate, about 53% of vinyltoluene, and about 7% of methacrylic acid was prepared as in Example 1(a), substituting vinyltoluene for styrene.

(b) A copolymer dispersion containing an emulsion copolymer of about 67% of ethyl acrylate and about 33% of vinyltoluene was prepared as in Example 1(a), substituting vinyltoluene for styrene.

(c) Eighty parts of the dispersion obtained in part (a) was mixed with 20 parts of the dispersion obtained in part (b) and the mixture was then diluted with water to a solids concentration of 12%. Seventy-five parts of the resulting blended copolymer dispersion was mixed with 11.4 parts of the wax dispersion of part (d) of Example 1, 11.4 parts of the shellac dispersion of Example 6(c) and 1 part of the morpholine oleate solution of Example 1(f). The resulting coating composition was quite stable on storing. When applied to linoleum, vinyl and asphalt floor tile surfaces, it levelled well and dried rapidly to give tough surfaces characterized by excellent initial gloss and final gloss after submission to foot-traffic conditions. The coating was found to show no water-spotting when exposed to water for one hour after a four-hour drying at 25° C. Yet, it could be removed very easily with a dilute (3%) NH$_4$OH solution.

It is to be understood that changes and variations may be made without departing from the spirit and scope of the invention as defined in the appended claims.

We claim:

1. A composition comprising water, 8% to 25% by weight of a mixture of (A) 60% to 90% by weight of a copolymer of about 42% to 77% by weight of a compound selected from a group consisting of styrene and vinyltoluene, about 20% to 46% by weight of an ester of acrylic acid with a saturated aliphatic alcohol having 1 to 8 carbon atoms, and about 3% to 12% of a copolymerizable monoethylenically unsaturated carboxylic acid, and (B) 40% to 10% by weight respectively of a copolymer of about 60% to 90% by weight of an ester of acrylic acid with a saturated aliphatic alcohol having 1 to 8 carbon atoms and 10% to 40% by weight respectively of a compound selected from a group consisting of styrene and vinyltoluene.

2. A composition comprising water, 8% to 25% by weight of a mixture of (A) 60% to 90% by weight of a copolymer of about 42% to 77% by weight of a compound selected from the group consisting of styrene and vinyltoluene, about 20% to 46% by weight of an ester of acrylic acid with a saturated aliphatic alcohol having 1 to 8 carbon atoms, and about 3% to 12% by weight of a copolymerizable monoethylenically unsaturated carboxylic acid, and (B) 40% to 10% by weight respectively of a copolymer of about 58% to 90% by weight of an ester of acrylic acid with a saturated aliphatic alcohol having 1 to 8 carbon atoms and 10% to 36% by weight respectively of a compound selected from the group consisting of styrene and vinyltoluene and up to 6% of a copolymerizable monoethylenically unsaturated carboxylic acid.

3. An aqueous composition having a pH of at least about 7.5 and comprising water, 8% to 25% by weight of a mixture of (1) 20 to 90 parts by weight of a mixture of (A) 60 to 90 parts by weight of a copolymer of about 42% to 77% by weight of a compound selected from the group consisting of styrene and vinyltoluene, about 20% to 46% by weight of an ester of acrylic acid with a saturated aliphatic alcohol having 1 to 8 carbon atoms, and about 3% to 12% by weight of a copolymerizable monoethylenically unsaturated carboxylic acid, and (B) 40 to 10 parts by weight respectively of a copolymer of about 60% to 90% by weight of an ester of acrylic acid with a saturated aliphatic alcohol having 1 to 8 carbon atoms and 10% to 40% by weight respectively of a compound selected from the group consisting of styrene and vinyltoluene, (2) 5 to 60 parts by weight of a wax, (3) 5 to 40 parts by weight of an alkali-soluble resin, and (4) 0.5% to 8% by weight, based on the total weight of (1), (2), and (3), of surfactant.

4. A composition as defined in claim 3 in which the alkali-soluble resin is shellac.

5. A composition as defined in claim 3 in which the alkali-soluble resin is an alkali-soluble polyester of an aliphatic dicarboxylic acid with an aliphatic polyhydric alcohol.

6. An aqueous composition having a pH of at least about 7.5 and comprising water, 8% to 25% by weight of a mixture of (1) 20 to 90 parts by weight of a mixture of (A) 60 to 90 parts by weight of a copolymer of about 42% to 77% by weight of a compound selected from the group consisting of styrene and vinyltoluene, about 20% to 46% by weight of an ester of acrylic acid with a saturated aliphatic alcohol having 1 to 8 carbon atoms, and about 3% to 12% by weight of a copolymerizable monoethylenically unsaturated carboxylic acid, and (B) 40 to 10 parts by weight respectively of a copolymer of about 58% to 90% by weight of an ester of acrylic acid with a saturated aliphatic alcohol having 1 to 8 carbon atoms and 10% to 36% by weight respectively of a compound selected from the group consisting of styrene and vinyltoluene and up to 6% by weight of a copolymerizable monoethylenically unsaturated carboxylic acid, (2) 5 to 60 parts by weight of a wax, (3) 5 to 40 parts by weight of an alkali-soluble resin, and (4) 0.5% to 8% by weight, based on the total weight of (1), (2), and (3), of surfactant.

7. A composition having a pH of about 2 to 11 and comprising water, 8% to 25% by weight of a mixture of (A) 60% to 90% by weight of a copolymer of about 42% to 77% by weight of styrene, about 20% to 46% by weight of ethyl acrylate, and about 3% to 12% by weight of methacrylic acid, and (B) 40% to 10% by weight respectively of a copolymer of about 60% to 90% by weight of ethyl acrylate and 10% to 40% by weight of styrene.

8. A composition having a pH of about 2 to 11 and comprising water, 8% to 25% by weight of a mixture of (A) 60% to 90% by weight of a copolymer of about 42% to 77% by weight of vinyltoluene, about 20% to 46% by weight of ethyl acrylate, and about 3% to 12% by weight of methacrylic acid, and (B) 40% to 10% by weight respectively of a copolymer of about 60% to 90% by weight of ethyl acrylate and 10% to 40% by weight of vinyltoluene.

9. A composition having a pH of about 2 to 11 and comprising water, 8% to 25% by weight of a mixture of (A) 60% to 90% by weight of a copolymer of about 42% to 77% by weight of styrene, about 20% to 46% by weight of methyl acrylate, and about 3% to 12% by weight of acrylic acid, and (B) 40% to 10% by weight respectively of a copolymer of about 60% to 90% by weight of methyl acrylate and 10% to 40% by weight of styrene.

10. A composition having a pH of about 2 to 11 and comprising water, 8% to 25% by weight of a mixture of (A) 60% to 90% by weight of a copolymer of about 42% to 77% by weight of styrene, about 20% to 46% by weight of ethyl acrylate, and about 3% to 12% by weight of methacrylic acid, and (B) 40% to 10% by weight respectively of a copolymer of about 58% to 90% by weight of ethyl acrylate and 10% to 36% by weight respectively of styrene, and up to 6% by weight of methacrylic acid.

11. A composition having a pH of about 2 to 11 and comprising water, 8% to 25% by weight of a mixture of (A) 60% to 90% by weight of a copolymer of about 42% to 77% by weight of styrene, about 20% to 46% by weight of butyl acrylate, and about 3% to 12% by weight of itaconic acid, and (B) 40% to 10% by weight respectively of a copolymer of about 58% to 90% by weight of butyl acrylate and 10% to 36% by weight respectively of styrene, and up to 6% by weight of itaconic acid.

12. A composition having a pH of about 2 to 11 and comprising water, 8 to 25% by weight of a mixture of (A) 60 to 90% by weight of a copolymer of about 42 to 77% by weight of a compound selected from the group consisting of styrene and vinyltoluene, about 20 to 46% by weight of an ester of acrylic acid with a saturated aliphatic alcohol having 1 to 8 carbon atoms, and about 3 to 12% of a copolymerizable monoethylenically unsaturated carboxylic acid, and (B) 40 to 10% by weight respectively of a copolymer of about 60 to 90% by weight of an ester of acrylic acid with a saturated aliphatic alcohol having 1 to 8 carbon atoms and 10 to 40% by weight respectively of a compound selected from the group consisting of styrene and vinyltoluene.

13. A composition having a pH of about 2 to 11 and comprising water, 8 to 25% by weight of a mixture of (A) 60 to 90% by weight of a copolymer of about 42 to 77% by weight of a compound selected from the group consisting of styrene and vinyltoluene, about 20 to 46% by weight of an ester of acrylic acid with a saturated aliphatic alcohol having 1 to 8 carbon atoms, and about 3 to 12% by weight of a copolymerizable monoethylenically unsaturated carboxylic acid, and (B) 40 to 10% by weight respectively of a copolymer of about 58 to 90% by weight of an ester of acrylic acid with a saturated aliphatic alcohol having 1 to 8 carbon atoms and 10 to 36% by weight respectively of a compound selected from the group consisting of styrene and vinyltoluene and up to 6% of a copolymerizable monoethylenically unsaturated carboxylic acid.

References Cited in the file of this patent

UNITED STATES PATENTS

| 2,606,165 | Chapin et al. | Aug. 5, 1952 |
| 2,695,277 | Pabst et al. | Nov. 23, 1954 |